(12) United States Patent
Chuang (10) Patent No.: US 6,189,872 B1
(45) Date of Patent: Feb. 20, 2001

(54) FROTH ACTIVATOR APPARATUS AND METHOD

(75) Inventor: Karl T. Chuang, Edmonton (CA)

(73) Assignee: AMT International, Inc., Richardson, TX (US)

( * ) Notice: Under 35 U.S.C. 154(b), the term of this patent shall be extended for 0 days.

(21) Appl. No.: 09/177,719

(22) Filed: Oct. 23, 1998

(51) Int. Cl.$^7$ .................................................. B01F 3/04

(52) U.S. Cl. .................... 261/114.3; 261/114.4; 261/114.5

(58) Field of Search .................... 261/114.1, 114.3, 261/114.4, 114.5

(56) References Cited

U.S. PATENT DOCUMENTS

| | | | |
|---|---|---|---|
| 2,693,949 | * 11/1954 | Huggins | 261/114.3 |
| 2,718,900 | 9/1955 | Nutter | 137/512 |
| 3,282,576 | 11/1966 | Bruckert et al. . | |
| 3,658,306 | * 4/1972 | Jones | 261/114.1 |
| 3,700,216 | 10/1972 | Uitti et al. . | |
| 4,101,610 | 7/1978 | Kirkpatrick et al. . | |
| 4,184,857 | * 1/1980 | Iijima et al. | 261/114.3 |
| 4,275,021 | 6/1981 | Kirkpatrick et al. . | |
| 4,301,098 | 11/1981 | Mix | 261/114 |
| 4,499,035 | 2/1985 | Kirkpatrick et al. . | |
| 5,049,319 | * 9/1991 | Nye | 261/114.1 |
| 5,106,556 | * 4/1992 | Binkley et al. | 261/114.3 |
| 5,242,628 | * 9/1993 | Nye | 261/114.1 |
| 5,453,222 | * 9/1995 | Lee et al. | 261/114.4 |
| 5,480,595 | * 1/1996 | Yeoman et al. | 261/114.3 |
| 5,895,608 | * 4/1999 | Lee et al. | 261/114.5 |
| 5,951,827 | * 9/1999 | Breedon | 261/114.1 |

FOREIGN PATENT DOCUMENTS

| | | |
|---|---|---|
| 790436 | 2/1958 | (GB) . |
| 1279870 | 6/1972 | (GB) . |

OTHER PUBLICATIONS

International Search Report mailed Dec. 10, 1999 from the PCT with regard to International Application PCT/US99/24963.

Jones et al., "Tray Performance Evaluation," Chemical Engrng Proc., vol. 71, No. 6, Jun. 1975.

Winter et al., "Froth Initiators Can Improve Tray Performance," (No Date).

* cited by examiner

Primary Examiner—C. Scott Bushey
(74) Attorney, Agent, or Firm—Baker Botts L.L.P.

(57) ABSTRACT

The present invention provides an apparatus for use in the contact between a vapor and a liquid. In one embodiment, a column is provided having a generally vertical shell. A plurality of vertically spaced, horizontal fluid contacting trays for contacting the vapor and the liquid within the column may also be provided. Each horizontal contacting tray may include a liquid receiving area, an active perforated area and a liquid discharge area. An imperforate inlet area may be formed from a perimeter section of the liquid receiving area, and secured to the inner surface of the column. A downcomer may be positioned above said inlet area and inward from the inner wall surface of the column whereby the downcomer receives liquid from the liquid discharge area of an upper tray and directs flow to the inlet area. A froth activator may also be provided for contacting the liquid from the downcomer. The froth activator may include; a substantially vertical deflector positioned at the inlet area such that liquid from the downcomer flows over the froth activator assembly; a raised, horizontal flat activator surface having a plurality of fixed sized openings distributed uniformly across the activator surface corresponding to a plurality of fixed sized openings distributed uniformly across a portion of said horizontal fluid contacting tray below the froth activator; and a downstream edge being positioned below the upper portion of the deflector. A downstream edge surface may extend vertically down from the activator surface to attach to the fluid contacting tray.

8 Claims, 5 Drawing Sheets

FROTH ACTIVATOR APPARATUS AND METHOD

This invention relates to a froth activator apparatus and method. It particularly pertains to a novel froth activator arrangement and assembly for use with fractionation trays and within fractionation columns and other related apparatus in the separation or distillation between two fluids such as a vapor and a liquid.

BACKGROUND OF THE INVENTION

Distillation is a process in which a liquid and a vapor mixture of two or more substances is separated into its component fractions of desired purity, by the application and removal of heat. Distillation columns are designed to achieve this separation efficiently. One type of column which is used in distillation is a tray column where a number of trays of various designs are used to support the liquid to provide better contact between process vapor and liquid which leads to better separation between the substances into their respective components.

Basic distillation begins from a top of a column to the bottom of the column. Heavier process liquid flows down the column while lighter process vapor ascends up the column. The main components of distillation columns include a vertical shell where the separation of the process vapor and liquid substances occurs, and column internals comprised of fractionation trays alone or in combination with other devices such as structured packing. The column internals increase and enhance the separation between the process vapor and liquid. The internal configurations of the column internals such as tray spacing, column diameter, placement of assemblies to enhance flow increase the efficiency and thereby lead to a lesser requirement of energy.

In traditional mass transfer exchange system, the separation of fluids was often inefficient and expensive. This was due to the differences between the substances and the enormous amounts of energy required to begin the process. For example, a substantially clear and heavier process liquid enters the top of the distillation column and on to a perforated fractionation tray. The process liquid flows across the tray and over a downcomer and downcomer region to a tray inlet portion below. The process fluid at this point is highly dense and can cause seepage through the perforations at the inlet portion of the fractionation tray. This seepage is typically called weeping and leads to a higher energy requirement and lower efficiency in the distillation process. Those skilled in the art will recognize that weeping at the inlet portion is much less tolerable than that at a discharge portion before the liquid enters the downcomer because the process liquid is less active at the inlet portion.

To prevent weeping and increase the activity of the heavier process fluid, the fractionation trays are designed for the pressure drop through numerous perforations across the tray surface to counterbalance the inlet liquid head. Previous fractionation trays incorporated various designs which attempted to prevent the weeping while increasing the activity of the process fluid by deflecting the dense liquid over the initial tray inlet portion perforations of the tray. These devices were commonly referred to as bubble promoters.

Bubble promoters of prior art fractionation trays included sloped and box-like structures. U.S. Pat. No. 3,282,576 to Bruckert discloses a sloped surface at the tray inlet area. The Bruckert device comprises a "roof-like" structure with an imperforate ascending portion which receives the dense process liquid and a perforated descending portion where lighter process vapor from below the tray ascends through the perforation. However, under high process vapor flows, the vapor streams can shoot through the heavier liquid and hit the underside of the tray above. This results in entrainment where the liquid is carried by the vapor to hit the bottom of the tray above. This reduces tray efficiency and can cause contamination of the substances. Excessive entrainment can lead to flooding of the tray section where the increased pressure from the excessive vapor flow can force the heavier fluid into the downcomer region which backs up the flow of liquid onto the tray above. This affects the capacity of the entire column and increases the energy requirements of the system thus lowering efficiency. The Bruckert device also accelerates the process vapor into the process liquid which increases the flow velocity over the fractionation tray surface. Any unnecessary acceleration will cause a maldistribution of fluid across the fractionation tray which changes flow patterns in an undesirable manner and lowers the efficiency of the separation process.

Another prior art bubble promoter is disclosed in U.S. Pat. No. 3,700,216 to Uitti et al. The Uitti device employs a sloped imperforate surface as in the Bruckert device but comprises a vertical drop and opening at the downstream end from the tray inlet region. However, the flow of vapor from below the tray is excessively aerated and substantially forced across the tray surface. This is typically called a spraying effect and interferes with the normal interaction of process vapor and liquid across the fractionation tray by changing the flow pattern. The aeration of the liquid also prevents interaction between the vapor and liquid at the inlet portion of the tray which is critical to the efficiency of the tray and column.

One attempt to control the aeration at the tray inlet portion and spraying is disclosed in U.S. Pat. No. 4,275,021 to Kirkpatrick et al. The device disclosed in Kirkpatrick comprises an adaptation of part of the inlet of the fractionation tray to have two imperforate wall members separated by an intermediate perforated wall member. While the Kirkpatrick apparatus reduces the amount of horizontal jetting or spraying of the vapor across the fractionation tray surface, a new problem is introduced whereby the perforations of the intermediate member can flood the tray inlet region by shooting upward under high vapor pressures. The higher vapor pressure will back the denser process fluid into the downcomer and onto the tray above. Additionally, under lower vapor pressure, the process fluid flowing from the downcomer will not be activated as the denser and heavier fluid flows over the intermediate perforated wall member thus preventing the dense process liquid from becoming active and lowering the efficiency of the tray and column.

Accordingly, there is a need for a tray inlet apparatus which activates the denser and heavier process fluid while allowing interaction with the lighter process vapor. The activation of the process fluid occurs while eliminating any weeping or flooding in the tray inlet area and spraying acceleration across the fractionation tray surface.

SUMMARY OF THE INVENTION

This invention relates to a fluid contacting and dispersing apparatus of the type used in distillation and absorption systems for mass transfer exchange between two fluids of differing masses. According to the present invention, a froth activator is used to contact a liquid with a vapor over a fractionation tray to activate the liquid and increase the efficiency of the distillation process.

The distillation process occurs in a column having a generally vertical shell enclosing the distillation system. A plurality of horizontal fluid contacting trays are positioned vertically and spaced apart within the shell. The fluid contacting trays facilitate the contact between a vapor and a liquid within the column. Each fluid contacting tray has a liquid receiving area, an active area and a liquid discharge area. The liquid receiving area is a tray inlet portion which is formed from a perimeter section of the liquid receiving area. The tray inlet portion is secured to the inner surface of the column. A downcomer is positioned above the tray inlet portion. The area of the tray inlet below the downcomer is imperforate. The downcomer receives liquid from the liquid discharge area of an upper tray and directs flow to the tray inlet area of the fluid contacting tray below. A froth activator and dispersion initiator assembly for contacting liquid from the downcomer is positioned at the tray inlet portion.

The froth activator has a substantially vertical inlet weir or deflector positioned at the inlet area. The heavier process liquid from the downcomer flows over the froth activator. An upper portion of the inlet weir extends above the froth activator. A raised substantially flat froth activator surface extends horizontally from the inlet portion. The flat froth activator surface has a plurality of fixed sized openings distributed uniformly across the surface. Each fixed size opening corresponds to a plurality of fixed sized opening in the tray inlet portion directly below the froth activator. A downstream wall surface extends vertically down from the activator surface to attach to the fluid contacting tray.

In other embodiments of the present invention, an additional row of fluid apertures are provided in the froth activator. The greater number of perforations are to accommodate more valves and to balance a longer fluid flow path such that the hydraulic gradient above the tray inlet region is equal to the gradient above the active area of the tray. Preferably, a staggered pattern is used to provide a uniform bubbling action at the inlet area of the tray because each individual row will contact the flow independently providing greater balancing for the larger flow tray.

The froth activator of the present invention initiates bubbling to maintain the process liquid froth height and activity at a more constant state over the active area of the tray while preventing flooding of the tray section and spraying of the process fluid. This increases the column handling capacity and efficiency over the entire tray and column at minimal or little cost increase. The froth activator also allows for more efficient distillation across larger diameter trays with a longer fluid flow path. The assembly of the present invention also allows for an increase in the liquid rate capacity of a distillation column. The apparatus of the present invention increases the activation of the liquid at the critical inlet region by providing finer or microdispersion vapor such that the interaction with ascending active area process vapor is greater than traditional bubble initiators or promoters.

BRIEF DESCRIPTION OF THE DRAWINGS

In the accompanying drawings which illustrate, by way of example, embodiments of the present invention.

DESCRIPTION OF THE PREFERRED EMBODIMENTS

The following descriptions of FIGS. 1 to 10 describe preferred embodiments of the invention. The fractionation tray of the present is illustrated but is not limited to this embodiment. The descriptive language used both in the specification and claims is for the purposes of clarity and convenience and not with any purpose of implied limitation to mass transfer art, or to a vertical disposition of parts as is usually the case within a mass transfer exchange tower column.

The term "fluid" is adopted from the terminology of mass transfer applications, in order to describe generally, without restriction to mass transfer technology, the kind of particulates that would flow through the valve of the present invention. The particulates in mass transfer operations generally consist of droplets or bubbles at the molecular level or on a microscopic scale. Typically, process "vapor" or "gas" is a lighter fluid and process "liquid" is a heavier fluid. The fractionation tray of the present invention is ideally utilized in a high fluid pressure environment, such as in a trayed tower column. This high fluid pressure environment allows for the separation or fractionation of fluids, gases, liquids and vapors.

The term "froth" refers to the active interaction between the process vapor and the process liquid. The lighter vapor will typically bubble or froth during ascension through the tower. The heavier liquid becomes active to form a froth to enhance the mass transfer exchange.

The terms "tray" and "tray deck" refer to the tray surface within a tower column used in mass transfer applications. The tray may also be described as a fluid contacting fractionation tray. In a typical tray installation, the upper surface of the tray is toward the top of the tower and the lower surface of the tray is toward the bottom of the tower. Many different trays may be contained within a trayed or fractionation column. Several tray openings or perforations are positioned throughout the tray deck surface. Ordinarily, valves or other devices are positioned above the tray openings to regulate the flow of vapors through the liquids. However, the term tray herein means simply any surface used in the distillation between two different substances.

The froth activator of the present invention is constructed to be positioned on the mass transfer fractionation trays. The fractionation tray and froth activator is illustrated, described and claimed, generically and in preferred specific embodiments.

The froth activator assembly of the present invention is preferably positioned at the tray inlet portion of the fractionation tray for use in a tower column and fluid environment. However, it is not intended to restrict the application of the invention to an apparatus for use in only a fluid environment or tower column.

Throughout the specification and claims, reference is made to "movable" as generally describing the movement of a tray valve when inserted into the froth activator valve perforation. In general, a person of ordinary skill in the art would know that a valve assembly or other device of the present invention preferably moves in an upward and downward motion relative to the tray deck. This movement allows for the fluid to pass from below the tray deck to the upper surface to accomplish the fractionation of fluids required by mass transfer technology at different flow rates. The distance between the tray deck and the dispersion valve defines a fluid escape passage or opening where upwardly flowing particles pass through.

Figure 1:
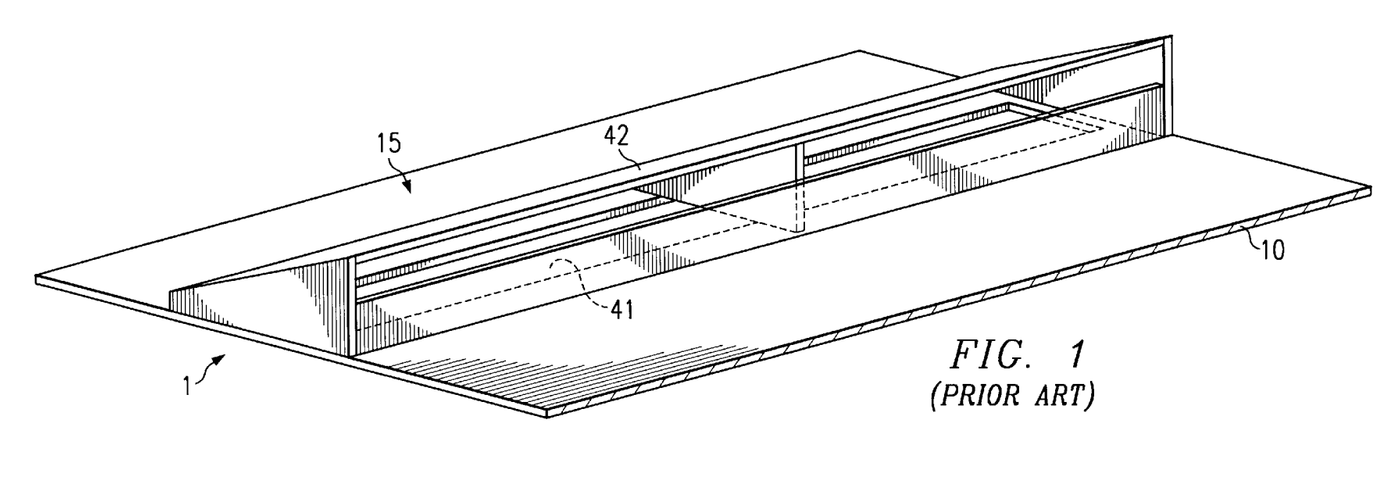
FIG. 1 is a simplified, perspective view of a prior art bubble initiator device incorporated into a horizontal column tray.

Referring to the drawings, FIG. 1 is an isometric view looking downwardly on an assembly of a prior art bubble promoter. Heavier fluid flow is introduced from a downcomer (not shown) above inlet portion 15. The fluid flows from the inlet portion 15 over the bubbling promoter apparatus 1. The heavier fluid from the downcomer flows over a slanted back portion 42 of the bubble promoter 1. A lighter fluid from beneath tray surface 10 flows through opening 41 in the bubble promoter. As the lighter fluid interacts with the heavier fluid, the flow of the lighter fluid forces the heavier fluid to have a "thrust" across tray surface 10. This lowers the efficiency of the tray and column by not providing a uniform fluid level across the tray decks.

Figure 2:
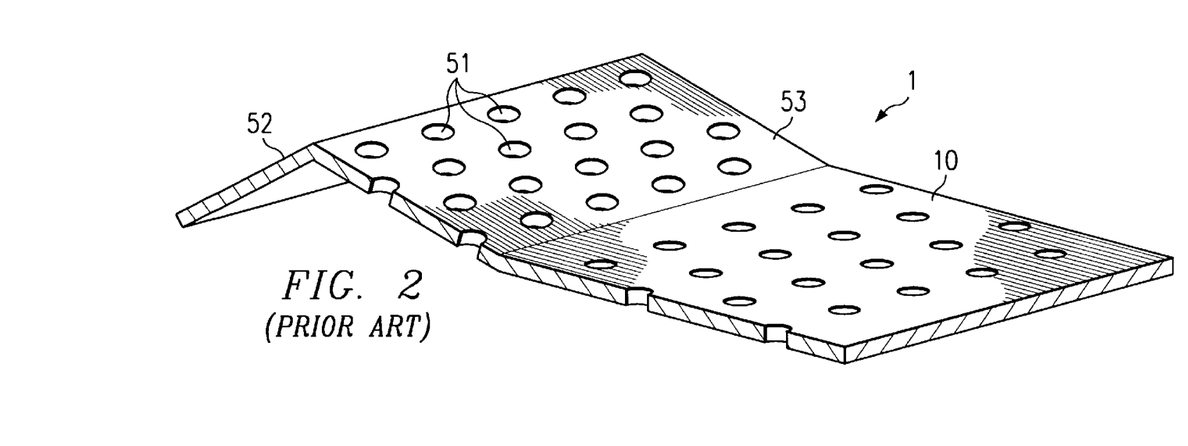
FIG. 2 is a perspective view of a prior art bubble initiator device showing a perforated and angled surface.

FIG. 2 is a perspective isometric view of a prior art bubble promoter with a perforated and sloped surface. Heavier fluid flows from the downcomer to the inlet portion and up a back portion 52 of bubble promoter 1. As the heavier fluid passes over bubble promoter 1, lighter fluid passes through perforations 51 in bubble promoter surface 53. The lighter fluid forces the heavier fluid upwards at surface 53 by shooting generally upwardly to push the heavier fluid to a higher liquid pressure/head above tray deck 10. This causes a higher gradient of fluid pressure over the tray inlet region 10 thereby forcing the lighter fluid vapor to be pushed to a lower vapor pressure at the opposite end of tray deck 10 from the tray inlet region 15. This lowers the efficiency of the tray deck and the distillation process by not providing a uniform fluid pressure across the entire tray deck.

Figure 3:
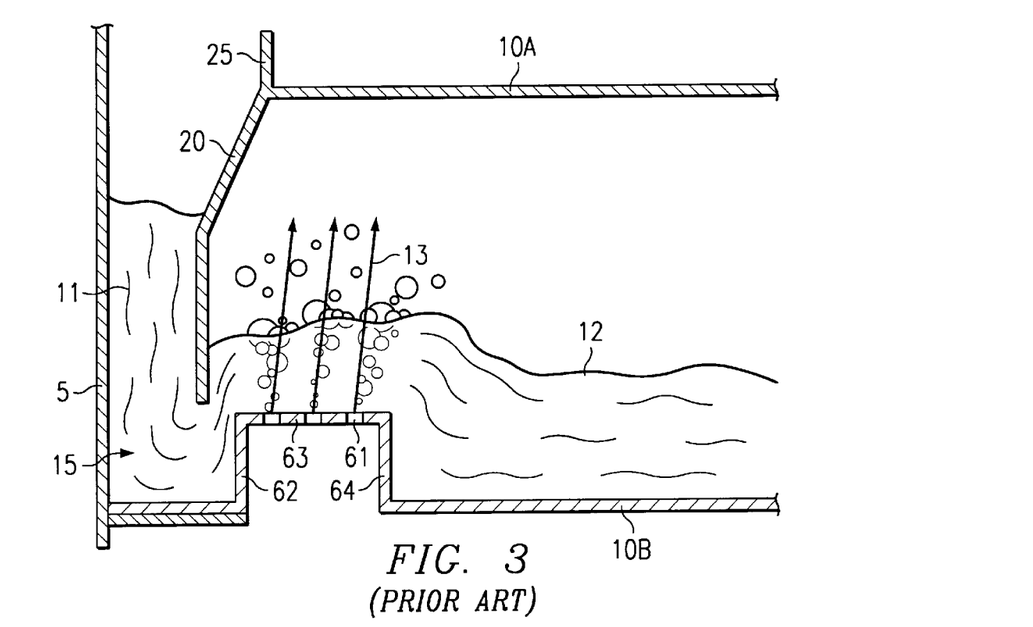
FIG. 3 is a side, cross-sectional view of a prior art bubble initiator device with a fluid flow level showing premature flooding at a tray inlet region.

FIG. 3 shows a cross sectional view of a prior art tray inlet region with the tray above, a downcomer and a bubble promoter device. Heavier fluid 11 travels from upper tray deck 10A over the outlet weir 25 and over downcomer 20. As it flows through tray inlet region 15, the fluid 11 passes over a substantially vertical portion 62 of bubble promoter 1. The prior art device has a first vertical portion 62, a horizontal flat surface 63 having perforations 61 for the passage of lighter fluid vapor 113. However, as the lighter fluid 113 passes through the heavier fluid 111, the lighter fluid 113 is directed up through the heavier fluid to shoot to the underside of the tray deck above to cause flooding in the tray section. This lowers the efficiency of the column and the entire mass transfer process.

Figure 4:
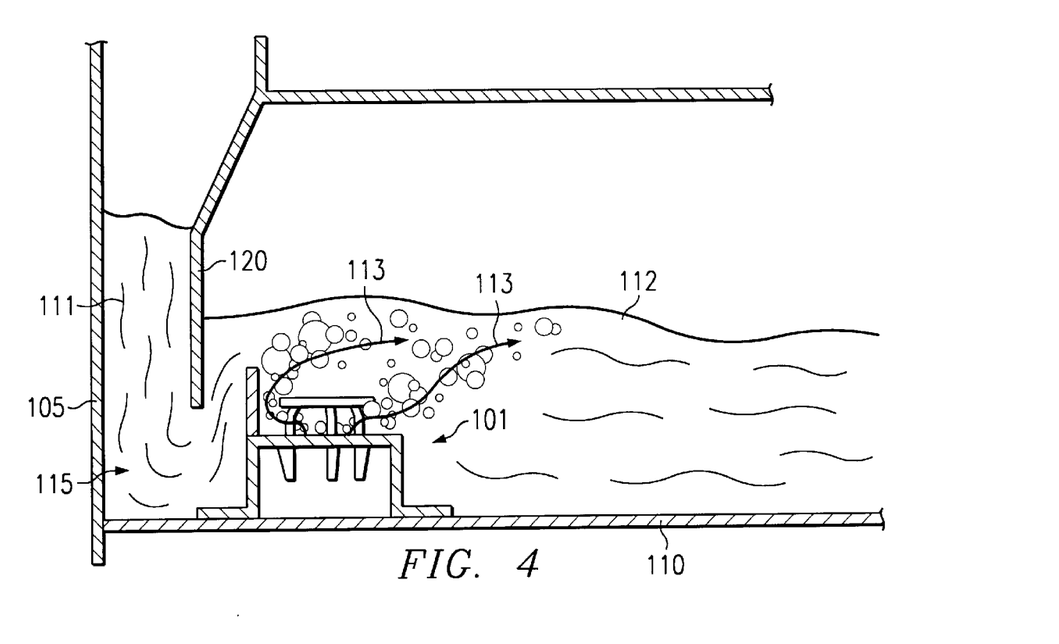
FIG. 4 is a side, cross-sectional view of a froth activator device of the present invention during use within a fluid flow showing a consistent fluid height at the tray inlet region and over the horizontal tray.
Figure 5:
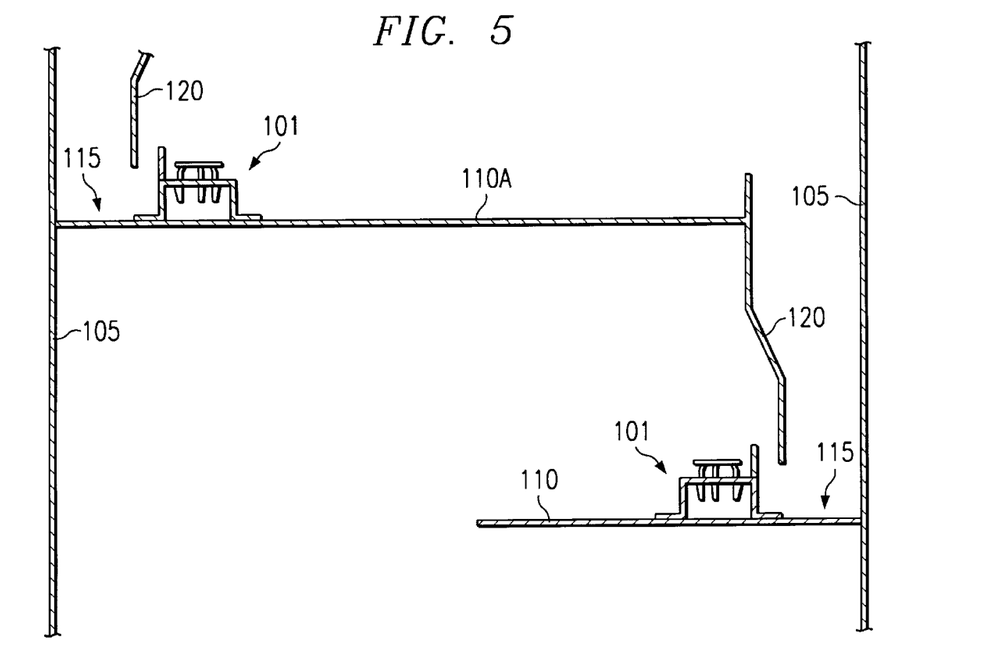
FIG. 5 is a cross-sectional view of a section of a tray column according to the invention.

Referring now to FIG. 4, a tray inlet bubble initiator assembly or froth activator according to the present invention is shown during operation. Heavier fluid 111 flows from the upper tray (not shown) and into the downcomer 120. The heavier fluid 111 flows into the inlet region 115 of the fractionation tray 110. Fluid 111 flows over the froth activator 101 of the present invention.

Preferably, the valve froth activator or bubble initiator of the present invention is a separate assembly which is fixed at the inlet region of the fractionation tray. The froth activator generally follows the shape of the downcomer apron at the inlet portion of the tray deck. The froth activator is positioned transverse to the flow of process liquid across the tray deck.

A first vertical solid section or inlet weir 140 of the froth activator 101 extends above the tray deck to a predetermined height above the tray deck. Inlet weir 140 is preferably a separate piece such that the height may be adjusted above the tray deck and the bubble promoter to produced the desired distillation effect. The inlet weir 140 may also be integral with the activator to form a one-piece bubble initiator assembly.

A horizontal flat activator surface 145 is positioned over the inlet region leading to a generally vertical, imperforate downstream wall portion 135. Downstream wall portion 135 is attached to the tray deck 110 by a small foot. The activator surface 145 contains fixed large diameter valve perforations or openings 160. The size and arrangement of the fixed valve perforations 160 is determined by the froth effect and separation effect desired by the design of the column. Preferably, the fixed valve perforations 160 correspond and are balanced to the number of vapor apertures 170 on the tray deck such that the vapor load is balanced between the inlet region and the active area of the tray deck. This leads to a more efficient and greater capacity across the tray deck. Fixed valve perforations 160 contain dispersion valves 130 to disperse the vapor flowing up from beneath the tray deck into a more horizontal flow parallel to the tray deck 110. Process vapor flowing from beneath the tray pass through vapor aperture 170 and through valve openings 160 in activator surface 145 and are deflected laterally to the flow of the process liquid such that vapor does not shoot upwardly thereby reducing and eliminating any flooding effect.

The process liquid flow path is from the tray inlet to the tray liquid discharge across the fractionation tray. The horizontal flat activator surface 145 of the froth activator in combination with dispersion valves 130 creates a froth effect in the liquid flowing from the inlet surface 115 over the imperforate deflector inlet weir 140. A descending wall portion 135 extends substantially vertically downwardly to attach to the fractionation tray surface 110. Once the froth is created and the liquid begins to bubble, the liquid becomes activated at the tray inlet portion and flows across the fractionation tray surface contacting fluid contact members or valves and flows thereacross to the liquid discharge portion of the tray and into the downcomer to the tray below.

In operation, heavier clear process liquid descending from the tray above is directed by the downcomer 120 onto the tray inlet surface 115. The tray inlet surface 115 is imperforated in this area. The heavier process liquid flows over the inlet weir 140 and traverses the flat froth activator surface 145. Lighter process fluid flowing from below the tray deck flows through vapor aperture 170 in the tray deck and valve perforations 160 in the flat froth activator surface 145. The clear and dense process liquid flows over the valves 130 positioned within each valve perforation. The dense liquid creates an artificial head of liquid on the froth activator which is lower in pressure than the head of liquid which is on the contact surface of fractionation tray. As a result of this artificial head with a lower and reduced pressure, the clear and dense process liquid emerging from the froth activator immediately becomes an active liquid or froth. Vapor flowing through the liquid in this region thereby makes the inlet portion of the tray active. As a result of the heavier liquid emerging from the downcomer and tray inlet region being made active, the activated froth carries and sustains this activity over the entire surface of the fractionation tray with the corresponding vapor-liquid contact members such as valves. Thus, the entire tray surface becomes active and the distillation process is enhanced.

Figure 6:
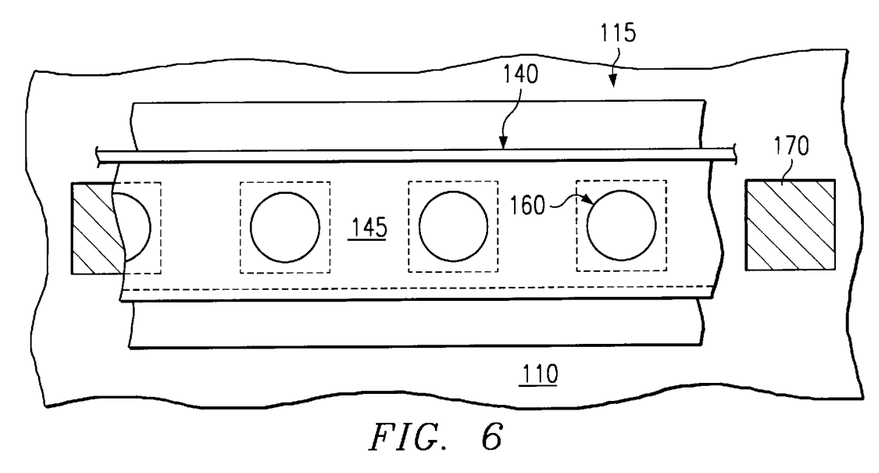
FIG. 6 is a partial overhead, cross-sectional plan view of one embodiment of the valve froth activator showing a single row of openings in the apparatus of the present invention.

The number and configuration of the valve perforations 160 of the froth activator and corresponding vapor perforations 170 of the fractionation tray deck depends upon the physical properties of the liquids and vapors to be distilled. The valve perforations 160 increase the performance of the tray over that of conventional bubble initiators by eliminating the thrust head to a more uniform froth height. Thus, there is a reduction in the hydraulic gradient across the tray. The valve froth activator of the present invention minimizes the weeping due to the use of the inlet weir and movable valves at higher process liquid flows. In practice, the number of valves is balanced such that the pressure head exerted in the tray inlet region is equal or lower than the pressure of the fluid over the remaining active area of the fractionation tray. Process vapor will flow preferentially through the froth activator which promotes and initiates bubbling. The lighter process vapor flowing from beneath the tray aerates the heavier process liquid reduces the density of the liquid and further reduces the resistance of the vapor flow at the tray inlet area. The active froth continues across the fractionation tray deck surface to increase the efficiency of the Referring now to FIGS. 6 and 7, the valve froth activator device of the present invention is shown from both overhead plan and cross-sectional side views of the activator. FIG. 6 shows a portion of the activator apparatus with the inlet region 115 of tray deck 110. In one embodiment, the valve froth activator 101 is a separate structure attached to the inlet region. Vapor aperture 170 is stamped or cut into tray deck 110. The vapor apertures 170 correspond to the vapor passages 100 of the transitional flat horizontal portion 145 of the fluid activator. The lighter process vapor from beneath the fractionation tray deck 110 flows through vapor apertures 170 and valve perforation 160 to contact with the valve 130. In this embodiment, a single row of vapor apertures 170 and valve perforation 160 are provided in the bubbling device.

Figure 7:
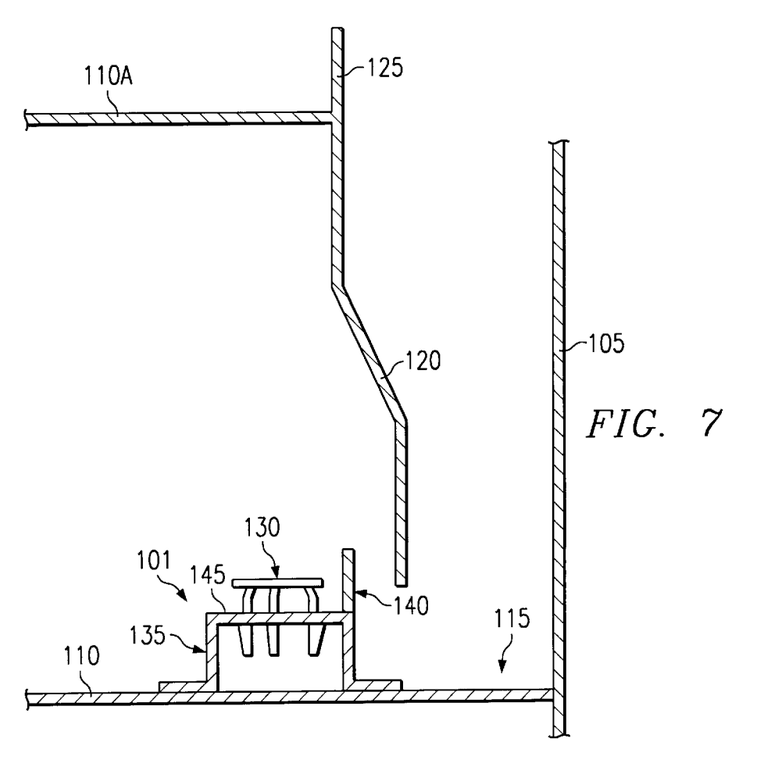
FIG. 7 is a cross-sectional elevation view of a tray inlet region with a fluid dispersion device inserted into the valve froth activator according to one embodiment of the invention.

FIG. 7 shows a side cross-sectional view of the froth activator with a valve within the horizontal portion 145. The process fluid is deflected from shooting upwardly by inlet weir 140 as it enters the inlet region 115 on the fractionation tray 110. Inlet weir 140 is configured such that the heavier process fluid from the downcomer is deflected over froth activator 101 and floating valves 130. In a side profile, valves 130 are preferably in a single row.

Figure 8:
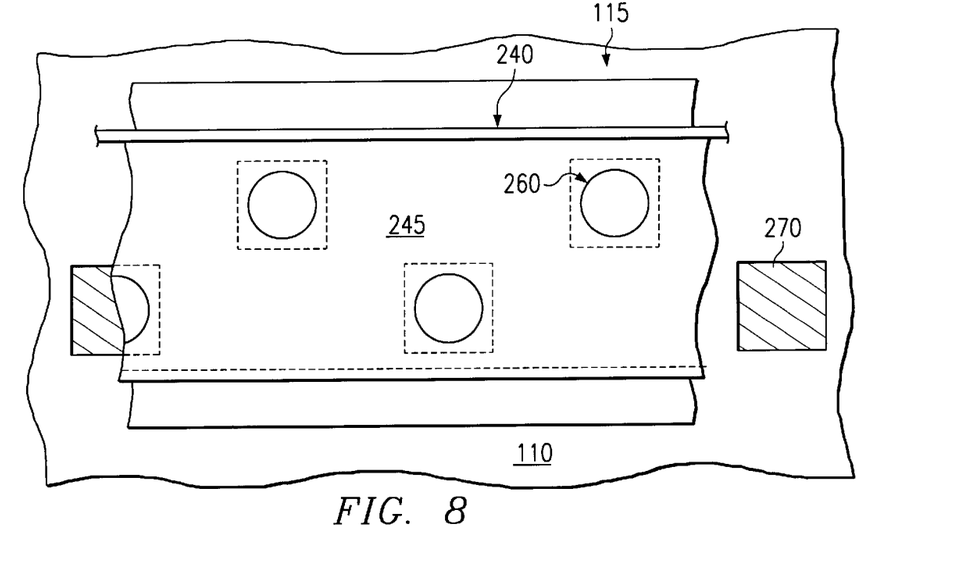
FIG. 8 is a partial overhead, cross-sectional plan view of another embodiment of the valve froth activator showing a dual, offset row of openings in the froth initiator apparatus.

An alternative embodiment of the valve froth activator apparatus of the present invention is shown in FIG. 8. A partial top plan cross sectional view is shown where at least two rows of fluid dispersing valve perforations 260 are offset along the horizontal flat fluid activator surface 245. The two rows of the fluid dispersing perforations 260 are preferably staggered such that no fluid aperture is in the direct plane of process liquid flow from another aperture. Similarly as shown in FIG. 6, the froth activator is a separate structure positioned near the tray inlet portion 115. Each valve perforation 260 in the froth activator corresponds to a vapor aperture 270 of the fractionation tray 110. As the lighter process vapor ascends from below the fractionation tray, the vapor flows through the vapor aperture 270 and corresponding valve perforation 260. The process vapor is then dispersed into a horizontal flow plane relative to the process liquid by the valve 230 (not shown).

Figure 9:
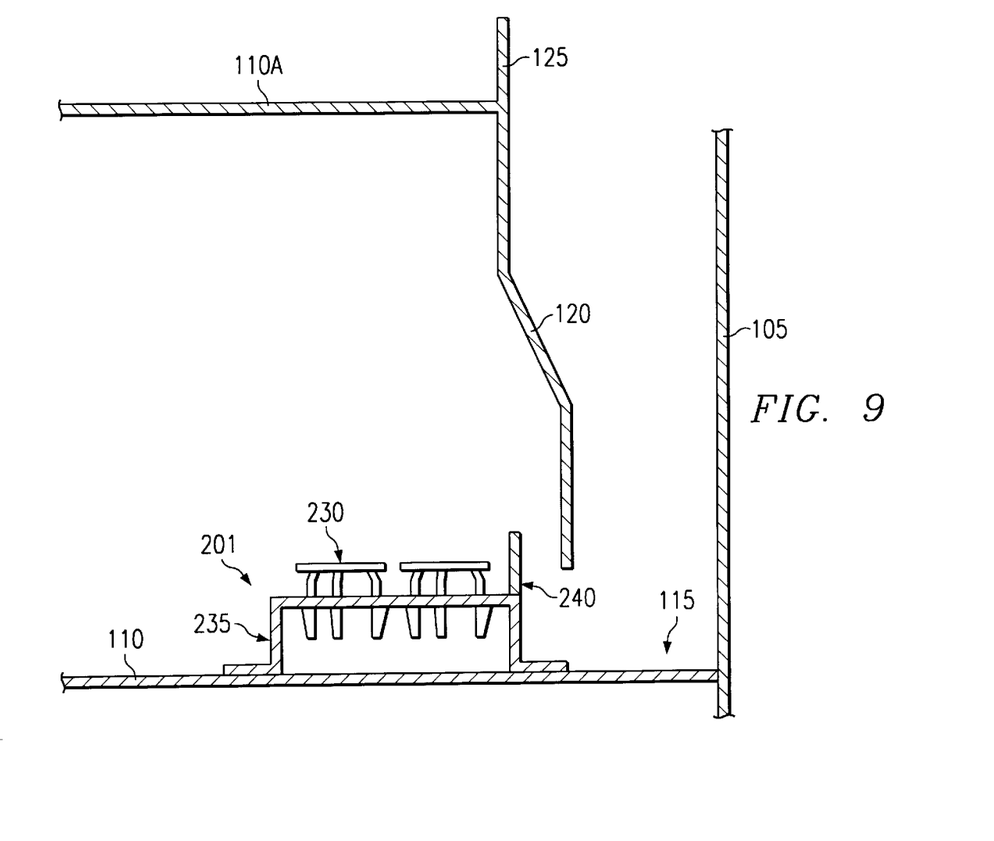
FIG. 9 is a cross-sectional elevation view of an alternative embodiment of the present invention showing fluid dispersion devices inserted into each of the openings in the froth activator.

FIG. 9 shows a side view of the froth activator of FIG. 8. The froth activator 201 is preferably positioned on the fractionation tray 110 near the downcomer 120 at the tray inlet region 115. Vertical deflector or inlet weir 240 is configured such that the heavier process fluid from the downcomer is deflected over froth activator 201 and floating valves 230. In a side profile, valves 230 are preferably side by side. This configuration provides for a greater number of valve perforation 260 and vapor apertures 270 in the froth activator. The number of valves is preferably proportional to a larger diameter column and fractionation tray such that the fluid gradient is equalized between the tray inlet region and the active area of the tray.

Figure 10:
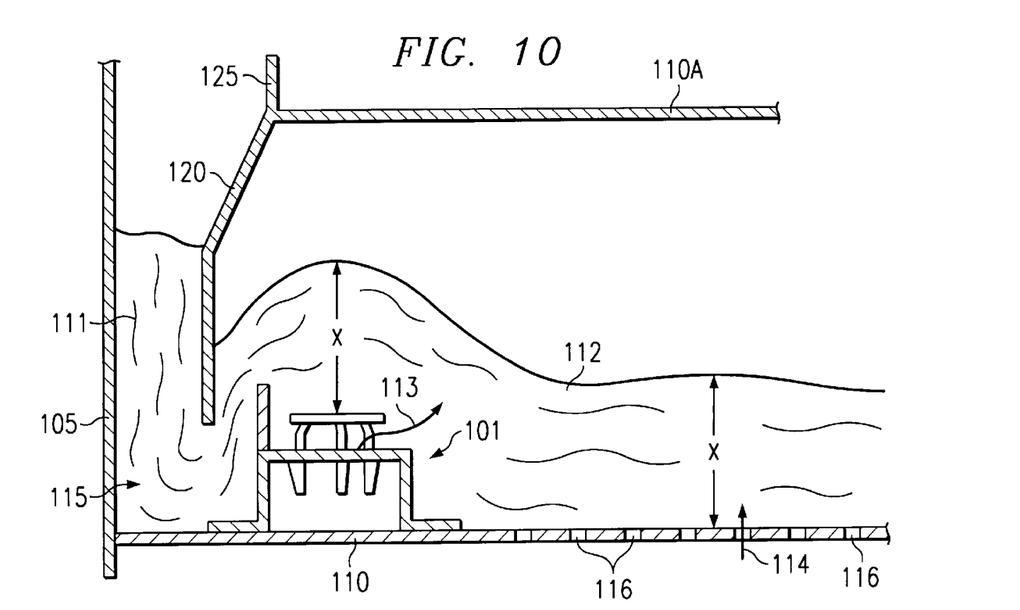
FIG. 10 is a cross-sectional elevation view of the valve froth activator of the present invention showing a height of liquid above the activator apparatus balanced with the liquid height across the tray deck wherein the hydraulic pressure gradient over the inlet region is proportional to the pressure gradient over the active area of the tray.

FIG. 10 is a cross-sectional view of the froth activator of the present invention during operation. As the heavier clear process fluid 111 flows from an upper fractionation tray 110A and over the downcomer 120, heavy pressure is exerted over tray inlet region 115. The process fluid then flows over the fluid activator 101 creating a pressure head over the froth activator as designated by X. As the lighter inlet process vapor 113 ascends from beneath the fractionation tray, the heavier process fluid becomes active process fluid 112. The flow of active fluid 112 over the remainder of tray 110 creates a hydraulic gradient. Lighter active area process vapor 114 passes through perforations 116 in the tray deck.

The number, size and arrangement of the fluid perforations in valve froth activator 101 is preferably balanced between the tray inlet region and the fractionation tray. As shown in FIG. 10, the design of the froth activator provides for a balanced fluid head pressure X between that of the tray inlet section 115 and the hydraulic pressure over the active region of the fractionation tray. The lighter ascending inlet process vapor 113 in the inlet region is proportionally balanced with lighter ascending active area process fluid 114 across the fractionation tray. The hydrostatic pressure head is depicted by X and is preferably directly proportional to the pressure flowing across the active area of the fractionation tray. This increases the efficiency of the column by reducing the energy needed for the heavier clear process fluid to interact with the lighter process vapor at the inlet region. The reduced energy also allows for a greater flow rate and capacity on each fraction tray thereby increasing the capacity of the entire fractionation column.

If the hydraulic pressure X at the inlet region is greater than the hydraulic pressure X across the fractionation tray surface, there will be a lesser pressure gradient over the fractionation tray surface. This will cause the lighter process vapor to be directed toward the perforations 116 since the pressure is greater at the inlet region 115. Thus, little or no interaction will occur at the inlet region or the froth activator such that the heavier process liquid 111 flowing from the downcomer will remain clear and inactive. The efficiency of the tray and column is greatly affected.

While the invention has been described with respect to its preferred embodiments, other different constructions may be used. For example, different valve types such as a perforated valve as described in U.S. Provisional Patent Application Ser. No. 60/061,504 filed Oct. 10, 1997, now Non-Provisional Patent Application Ser. No. 09/145,187 filed Sep. 1, 1998, may be used to further deflect and disperse the process vapor into finer droplets. The microdispersion characteristics of the valve will enhance the activation of the heavier process liquid such that efficiency across the tray is increased. Other fixed valve may be placed in the fluid apertures as required by the fractionation process. Moreover, the fluid apertures may be modified and adapted into different shapes and arrangements such as non-uniform, asymmetrical configurations such that the ascending process vapor is prevented from shooting upward to flood the tray section while promoting interaction between the heavier fluid and the lighter vapor. Other shapes, sizes and configurations of valve structures on the froth activator may be used by one skilled in the art to balance the hydraulic pressure gradient at the inlet region with that of the active area of the fractionation tray.

Other modifications include incorporating the froth apertures and valve perforations with valves into a portion of the fractionation tray deck. During fabrication of the fractionation tray, the inlet section is modified through stamping, molding or a combination of processes to form the froth activator of the present invention. In this configuration, the deflecting inlet weir would be a separate structure attached to the froth activator at the fractionation tray inlet.

These and various other modifications can be made to the disclosed or other embodiments without departing from the subject of the invention.

What is claimed is:

1. An apparatus for use in the contact between a vapor and a liquid comprising:
    a column having a generally vertical shell;
    a plurality of vertically spaced, horizontal fluid contacting trays for contacting the vapor and the liquid within said column, said each horizontal contacting tray having a liquid receiving area, an active perforated area and a liquid discharge area;
    an inlet area formed from a perimeter section of the liquid receiving area, said inlet area secured to the inner surface of said column, the inlet area being imperforate;
    a downcomer positioned above said inlet area and inward from the inner wall surface of the column whereby the downcomer receives liquid from the liquid discharge area of an upper tray and directs flow to the inlet area;
    a froth activator assembly for contacting the liquid from the downcomer, the froth activator having
        a substantially vertical deflector positioned at the inlet area such that liquid from the downcomer flows over the froth activator assembly, the deflector having a lower portion and an upper portion;
        a raised, horizontal flat activator surface having a plurality of fixed sized openings distributed uniformly across the activator surface corresponding to a plurality of fixed sized openings distributed uniformly across a portion of said horizontal fluid contacting tray below said froth activator, the activator surface being positioned below the upper portion of the deflector; and
        a downstream edge surface extending vertically down from the activator surface to attach to the fluid contacting tray.

2. The apparatus according to claim 1, wherein each of said plurality of fixed sized openings contains a movable, floating valve unit.

3. The apparatus according to claim 1, wherein each of said plurality of fixed sized openings contains a fixed valve unit.

4. The apparatus according to claim 1, wherein said plurality of fixed sized openings are distributed uniformly across the activator surface in a single row pattern.

5. The apparatus according to claim 1, wherein said plurality of fixed sized openings are distributed uniformly across the activator surface in an offset, staggered row pattern.

6. A method for activating process fluid flowing from a downcomer to interact with a process vapor on a fractionation tray within a mass transfer exchange system, said method comprising:
    deflecting the process fluid over a tray inlet area of the fractionation tray by passage of the fluid over an upper portion of a substantially vertical deflector positioned at the inlet area;
    reducing contact time between the process fluid and the process vapor to eliminate thrust and spraying at the tray inlet area;
    activating the process fluid by means of a froth activator;
    directing the process fluid across a perforated, generally horizontal activator surface overlying the fractionation tray said perforated, generally horizontal activator surface being positioned below the upper portion of the substantially vertical deflector; and
    equalizing hydraulic gradient of the process fluid at the tray inlet area with the hydraulic gradient of the process fluid at an active area of the fractionation tray.

7. The method according to claim 6, wherein said froth activator comprises:
    a raised, horizontal flat activator surface having a plurality of fixed sized openings distributed uniformly across the activator surface corresponding to a plurality of fixed sized openings distributed uniformly across a portion of fractionation tray below said froth activator; and
    a downstream edge surface extending vertically down from the activator surface to attach to the fractionation tray.

8. The method according to claim 6, wherein the froth activator has movable valves for reducing the contact time between the process fluid and process vapor to eliminate thrust and spraying at the tray inlet area.

* * * * *